United States Patent
De Smidt et al.

(10) Patent No.: US 12,467,983 B2
(45) Date of Patent: Nov. 11, 2025

(54) APPARATUS, SYSTEM, AND METHOD FOR EARLY INSULATION DAMAGE DETECTION FOR HIGH CURRENT CABLES

(71) Applicant: Shem, LLC, Highland Park, IL (US)

(72) Inventors: Marc Ryan De Smidt, Remlap, AL (US); Juan Higgs, Durbanville (ZA); Frederick J. Burkel, Highland Park, IL (US)

(73) Assignee: Shem, LLC, Highland Park, IL (US)

( * ) Notice: Subject to any disclaimer, the term of this patent is extended or adjusted under 35 U.S.C. 154(b) by 180 days.

(21) Appl. No.: 17/840,076

(22) Filed: Jun. 14, 2022

(65) Prior Publication Data
US 2022/0404436 A1 Dec. 22, 2022

Related U.S. Application Data

(60) Provisional application No. 63/211,495, filed on Jun. 16, 2021.

(51) Int. Cl.
*G01R 31/58* (2020.01)
*B60R 16/023* (2006.01)
(Continued)

(52) U.S. Cl.
CPC .......... *G01R 31/58* (2020.01); *B60R 16/0232* (2013.01); *B60R 16/03* (2013.01); *G01R 31/74* (2020.01); *H01B 9/02* (2013.01)

(58) Field of Classification Search
CPC ... B60R 16/0232; B60R 16/03; G01R 31/007; G01R 31/52; G01R 31/58; G01R 31/74;
(Continued)

(56) References Cited

U.S. PATENT DOCUMENTS 4,301,399 A * 11/1981 Miller .................. G01R 31/58
324/541
10,096,004 B2 10/2018 Viswanath et al.
(Continued)

FOREIGN PATENT DOCUMENTS

| KR | 20130002160 A | 1/2013 |
| KR | 20130007070 A | 1/2013 |
| KR | 101248207 B1 | 3/2013 |

OTHER PUBLICATIONS

Canadian Office Action for Application No. 3,163,255, dated May 27, 2025, 6 pages.

*Primary Examiner* — Judy Nguyen
*Assistant Examiner* — Brent J Andrews
(74) *Attorney, Agent, or Firm* — Brooks Kushman P.C.

(57) ABSTRACT

In at least one embodiment, a system including a battery cable and at least one vehicle controller is provided. The battery cable includes a detection shield positioned over an inner conductor. The at least one vehicle controller is programmed to: receive a first signal indicative of current or voltage of the detection shield of the battery cable and to compare the current or voltage to a predetermined value. The at least one vehicle controller is further programmed to generate an alert indicative of warning that the battery cable is exhibiting a failure prior to a short circuit condition occurring at the battery cable in the event the current or voltage is not equal to the predetermined value.

14 Claims, 3 Drawing Sheets

(51) Int. Cl.
  *B60R 16/03*    (2006.01)
  *G01R 31/74*    (2020.01)
  *H01B 9/02*     (2006.01)

(58) Field of Classification Search
  CPC ... H01B 9/02; H01B 1/00; H01B 3/00; H01B 5/00; H01B 7/00; H01B 9/00; H01B 11/00; H01B 12/00; H01B 13/00; H01B 15/00; H01B 17/00; H01B 19/00
  See application file for complete search history.

(56) References Cited

U.S. PATENT DOCUMENTS

| | | | |
|---|---|---|---|
| 2005/0017726 A1* | 1/2005 | Koran | G01R 31/007 324/433 |
| 2009/0066494 A1* | 3/2009 | Ishikawa | G01S 7/52004 340/438 |
| 2017/0179548 A1* | 6/2017 | Lee | H01H 85/10 |
| 2019/0385387 A1 | 12/2019 | Davidson | |
| 2022/0123542 A1* | 4/2022 | Ting | H02H 1/0007 |

\* cited by examiner

APPARATUS, SYSTEM, AND METHOD FOR EARLY INSULATION DAMAGE DETECTION FOR HIGH CURRENT CABLES

CROSS-REFERENCE TO RELATED APPLICATIONS

This application claims the benefit of U.S. provisional application Ser. No. 63/211,495 filed Jun. 16, 2021, the disclosure of which is hereby incorporated in its entirety by reference herein.

TECHNICAL FIELD

Aspects disclosed herein generally relate to an apparatus, system, and method for early insulation damage detection for electrical cables such as battery cables, starter-alternator cables, etc. for a vehicle. In particular, the apparatus, system and method for early insulation damage detection for such electrical cables may be used for class 7 and/or class 8 vehicles or for any other suitable vehicle. These aspects and others will be discussed in more detail herein.

BACKGROUND

KR101248207B1 to Lee provides a device for detecting a vehicle battery cable. The device senses damage to the battery cable through an electrical signal. The battery cable is surrounded by a conductor. The conductor is connected to a damage detecting device. An outer cover surrounds the conductor. The outer cover is an insulator.

SUMMARY

In at least one embodiment, a system including a battery cable and at least one vehicle controller is provided. The battery cable includes a detection shield positioned over an inner conductor. The at least one vehicle controller is programmed to: receive a first signal indicative of current or voltage of the detection shield of the battery cable and to compare the current or voltage to a predetermined value. The at least one vehicle controller is further programmed to generate an alert indicative of warning that the battery cable is exhibiting a failure prior to a short circuit condition occurring at the battery cable in the event the current or voltage is not equal to the predetermined value.

In at least another embodiment, a system for a vehicle including a fusible link and at least one vehicle controller is provided. The at least one vehicle controller is programmed to receive a signal indicative of an identification of the fusible link and to compare the identification to a plurality of previously stored identifications. The at least one vehicle controller is further programmed to determine that the fusible link is a properly installed fuse link in the vehicle in the event the identification matches a first previously stored identification of the plurality of previously stored identifications and to determine that the fusible link is improperly installed in the vehicle in the event the identification does not match any of the plurality of previously stored identifications.

In at least another embodiment, a method is provided that includes providing a first signal indicative of current or voltage of a detection shield of a battery cable and comparing the current or voltage to a predetermined value. The method further includes preventing a vehicle from being started in response to the current or voltage not being equal to the predetermined value.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It is recognized that the controller(s) or display(s) as disclosed herein may include various microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, such controller(s) or display(s) as disclosed utilize one or more microprocessors to execute a computer-program that is embodied in a non-transitory computer readable medium that is programmed to perform any number of the functions as disclosed. Further, the controller(s) or display(s) as provided herein includes a housing and the various number of microprocessors, integrated circuits, and memory devices ((e.g., FLASH, random access memory (RAM), read only memory (ROM), electrically programmable read only memory (EPROM), electrically erasable programmable read only memory (EEPROM)) positioned within the housing. The controller(s) or display(s) as disclosed also include hardware-based inputs and outputs for receiving and transmitting data, respectively from and to other hardware-based devices as discussed herein.

Embodiments disclosed herein generally enable the early detection for a battery cable failure in a vehicle. Class 7 and class 8 vehicles generally operate in an extremely harsh environment. Refuse trucks, among other types of truck, are generally designated as class 7 or 8 vehicle. Thermal events for truck in the refuse industry is an issue. Electrical issues may be attributed to a large number of root causes for such thermal events. Of particular interest is that of starter/battery cables shorting to ground. Current technologies utilize standard fuses, fusible links, etc. With respect to standard fuses, that is in certain applications, it may be difficult to specify a fuse that can handle the current required to start/crank the vehicle. Also, the fuse generally requires two extra "joints" or connection points in the electrical circuit which adds to an overall starting circuit resistance. Traditional fusible links create a joint to an existing wire/cable via solder. This causes a weak joint in the cable which in most cases fail prematurely due to corrosion and break due to the hard joint created in the cable.

Aspects disclosed herein generally provide for at least one solution that eliminates the need for a standard/traditional fuse. The fusible link as disclosed herein may not require a joint to another cable via soldering which eliminates the risk of corrosion or creation of a hard joint that could break over time. The embodiments disclosed herein may prevent electrically based-thermal events in the trucking/automotive industry via early detection by monitoring for rub points of a battery cable. As generally known, battery cables may be positioned in an engine compartment and may come into contact with truck sheet metal or other blunt objects. The battery cable may rub against burrs or other sharp/blunt projectiles associated with the sheet metal or other sharp objects surrounding the battery cable. The embodiments as disclosed herein may also disconnect one or more batteries from the vehicle when an electrical short occurs and may also reduce the intensity of the short circuit condition. By proactively disconnecting one or more batteries, there will be less current flow and thus the arc may be less intense.

The apparatus, system, and/or method as set forth herein may provide for an early warning detection for battery cable that is damaged. For example, the battery cable includes a conductive layer that surrounds the battery cable insulation. A secondary battery cable insulation layer surrounds the conductive layer. A wire may be connected to the conductive layer. A controller is coupled to the wire to monitor a voltage across the conductive layer. The controller may provide a direct current (DC) voltage to the conductive layer. On an opposite side of the battery cable, another wire will be provided and is attached a light emitting diode (LED) and a ground (GND). The controller reads or monitors an output voltage and current of the conductive layer to determine if the battery cable is experiencing any damage. When the controller determines that the battery cable is experiencing some of form of damage (e.g., detection of increased current at the conductor or decreased voltage at the conductor), the controller may activate an audio and/or visual warning on an instrument panel which is positioned in an interior of the vehicle (e.g., on an instrument panel). The LED is generally mounted outside of the vehicle for class 7 or 8 vehicles and the LED provides an indicator for the operator (or driver) that the outer insulation layer may be damaged before the operator enters the vehicle. If the driver receives the warning of potential damage to the battery cable, he/she may not be able to start the vehicle until the fault (e.g., damage to cable) is resolved/fixed.

The apparatus, system, and/or method as set forth herein may provide a smart fusible link. The smart fusible link may be a shorter version of the battery cable wire that extends between the one or more batteries and a main vehicle disconnect switch. The cable may include electronics integrated thereon to identify to the controller that the correct cable has been installed. The identification serves to provide a poke yoke feature to ensure the correct cable (or fusible link) is provided. The purpose of this poke yoke is that if the fusible link pops/breaks due to the warning being ignored in relation to the battery cable and needs to be replaced, the controller can ensure the correct fusible link has been installed and not just a generic cable that may not be adequate to meet current requirements. If the correct fusible link is not installed, the vehicle may not be able to crank.

Figure 1:
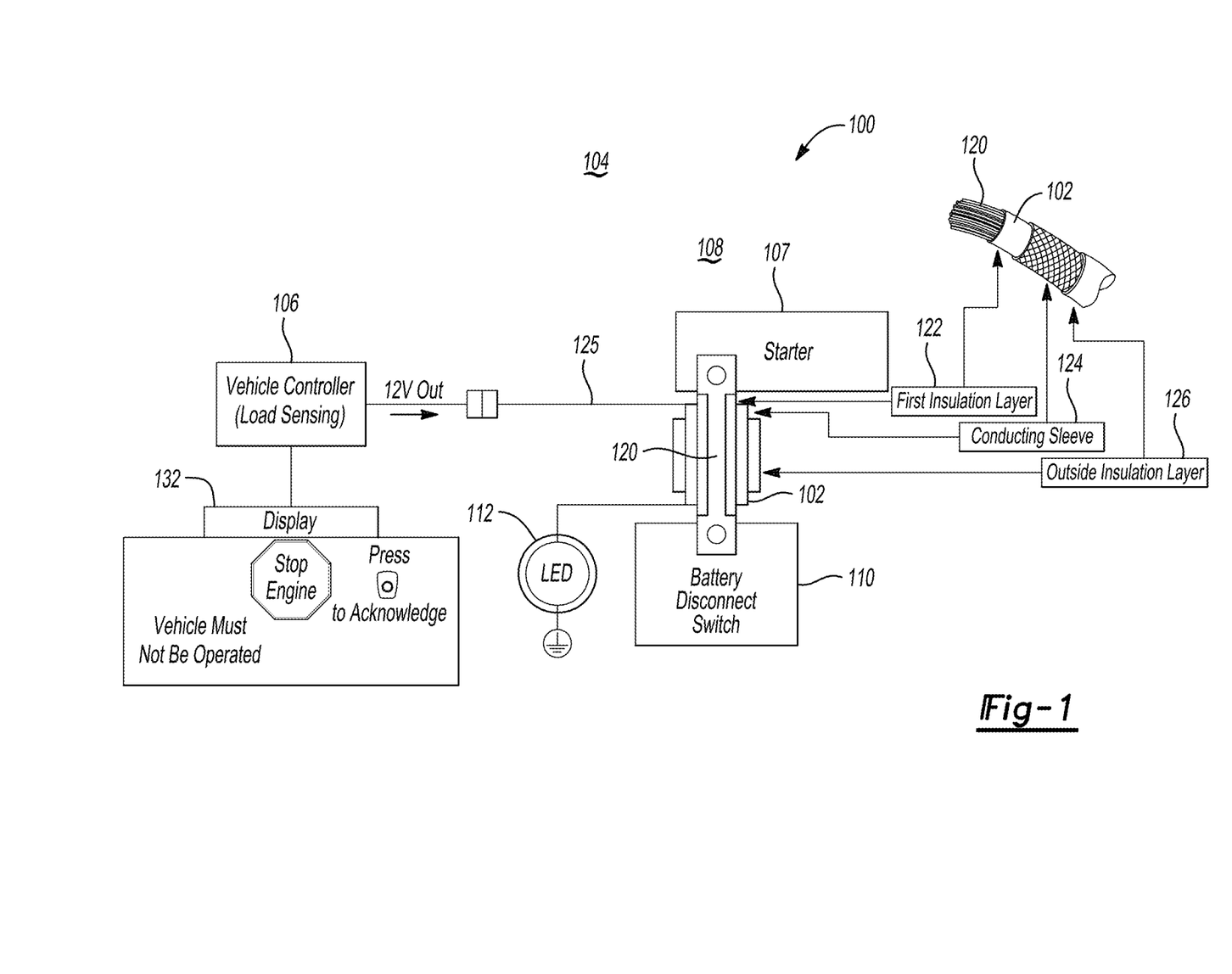
FIG. 1 generally depicts a first system for early insulation damage detection for a battery cable for a vehicle in accordance with one embodiment.

FIG. 1 generally depicts a first system 100 for early insulation damage detection for a battery cable 102 for a vehicle 104 in accordance with one embodiment. It is recognized that any reference herein to the battery cable 102 may also correspond to any high current carrying cable such as, but not limited to, a starter-alternator cable, etc. The first system 100 includes at least one vehicle controller 106 (hereafter the vehicle controller 106), a starter 107 (or starter relay), at least one battery 108 (or the battery 108), and a battery disconnect switch 110. As shown, the battery cable 102 includes one end coupled to the starter 107 and another end being coupled to the battery disconnect switch 110. An illumination device 112 (or at least one light emitting diode (LED)) is operably coupled to the battery cable 102.

The illumination device 112 may be positioned on an exterior portion of the vehicle 104 and may illuminate to indicate an issue with respect to the battery cable 102. In another embodiment, the illumination device 112 may not illuminate to indicate an issue with respect to the battery cable 102 and when the illumination device 112 is illuminated, this condition corresponds to the battery cable 102 operating properly. In general, an operator is trained to generally inspect the illumination device 112 before getting into the vehicle 104 to determine the state of the battery cable 102 (or battery 108) prior to starting the vehicle 104 (or truck). In general, in the event there is an issue with the battery cable 102, the illumination device 112 may illuminate when the battery disconnect switch 110 is activated. It is recognized that the illumination device 112 may also illuminate when there is no issue, for example, when the battery cable 102 is operating in a normal working range. In this case, the illumination device 112 may then be deactivated (i.e., or turned off) to provide an alert in the event there is an issue with the battery cable 102. This may be performed prior to the operator entering into the vehicle 104 and prior to turning on the ignition. The illumination device 112 may be positioned or located close to the battery disconnect switch 110.

The battery cable 102 includes an inner conductor 120, a first insulation layer 122, a conducting sleeve 124 (or detection shield), and an outer insulation layer 126. The inner conductor 120 conducts current from the battery 108 to the rest of the components in the vehicle 104. For example, when the starter relay 107 is activated, the starter relay 107 transfers a high current from the battery 108 to the rest of the vehicle 104. The first insulation layer 122 provides a protective coating over the inner conductor 120. The first insulation layer 122 may be subject to chaffing due to sharp or blunt objects in sheet metal or from surrounding components in the vehicle 104. Overtime, the sharp or blunt objects rub against the first insulation layer 122 and causes the inner conductor 120 to contact the sharp or blunt objects. Such contact may cause a short circuit condition and cause an electrical arc due to the high amount of current being conducted from the battery 108. This may cause a thermal event in the vehicle 104 given the large amount of current being conducted from the battery 108. To mitigate this issue, the conducting sleeve 124 is placed around, or surrounds the first insulation layer 122.

The vehicle controller 106 provides a predetermined voltage via a wired connection 125 to the conducting sleeve 124. In addition, the outer insulation layer 126 completely covers or surrounds the conducting sleeve 124. Thus, in this regard, in the event there is chaffing between the sharp or blunt objects between the battery cable 102 and sharp or blunt objects in the vehicle 104, such chaffing occurs with the outer insulation layer 126. If the chaffing penetrates the outer insulation layer 126 and makes contact with the conducting sleeve 124, the sleeve 124 experiences a voltage drop and an increase in current. The vehicle controller 106 detects the voltage drop/increase in current.

A display 132 is provided in the vehicle 104 and is operably coupled with vehicle controller 106. The vehicle controller 106 may be operably coupled with the display 132 via a data communication bus, such as for example, a Controller Area Network (CAN) bus or other suitable data communication bus. In this example, the vehicle controller 106 may communicate with the display 132 via CAN bus using Society of Automotive Engineers (SAE) J1939 protocol. The display 132 may also include the illumination device 112. In response to the vehicle controller 106 detecting the voltage drop across the conducting sleeve 124, the vehicle controller 106 transmits a command to the display 132. The display 132 provides a warning via the illumination device 112 and instructs the operator not to start the vehicle 104. In the event the operator starts the vehicle 104, the vehicle controller 106 may limit the speed (or derate engine speed, or inhibit cranking) to cause the operator to seek service to address the battery cable issue. It is recognized that the vehicle controller 106 may also control a buzzer (not shown) or other audible device that transmits audible signals to warn the operator of the battery cable issue. The vehicle controller 106 may control the audible device to continuously make an audible sound that may be unpleasant to the operator to compel the operator to seek service.

The vehicle controller 106 may be implemented as a telematics unit and also include a wireless based transmitter/receiver (Tx/Rx) (not shown) that may enable wireless transmission of the battery cable to a mobile device, server, or other suitable device. In one example, the transmitter may be a BLUETOOTH based transmitter/receiver that wirelessly transmits a signal indicative of the state of the battery cable 102 to a mobile device belonging to the operator. In the event the vehicle controller 106 determines that there is an issue with the battery cable 102, the vehicle controller 106 may wirelessly transmit a signal directly to the mobile device belonging to the operator to alert the operator of the battery cable issue. Similarly, the vehicle controller 106 may alternatively include a WiFi based transceiver that communicates with a server via WiFi. In this case, the vehicle controller 106 may transmit a signal to the server to alert a fleet manager that the trucks 104 in the fleet exhibits a battery cable fault. Similarly, the vehicle controller 106 may enable cellular communication between the vehicle 104 and the mobile device. For example, the vehicle controller 106 may include hardware/software to support, but not limited to, any one or more of the following cellular protocols: Global System for Mobile Communications (GSM), General Packet Radio Service (GPRS), cdmaOne, CDMA2000, Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/TDMA), and Integrated Digital Enhanced Network (iDEN).

Figure 2:
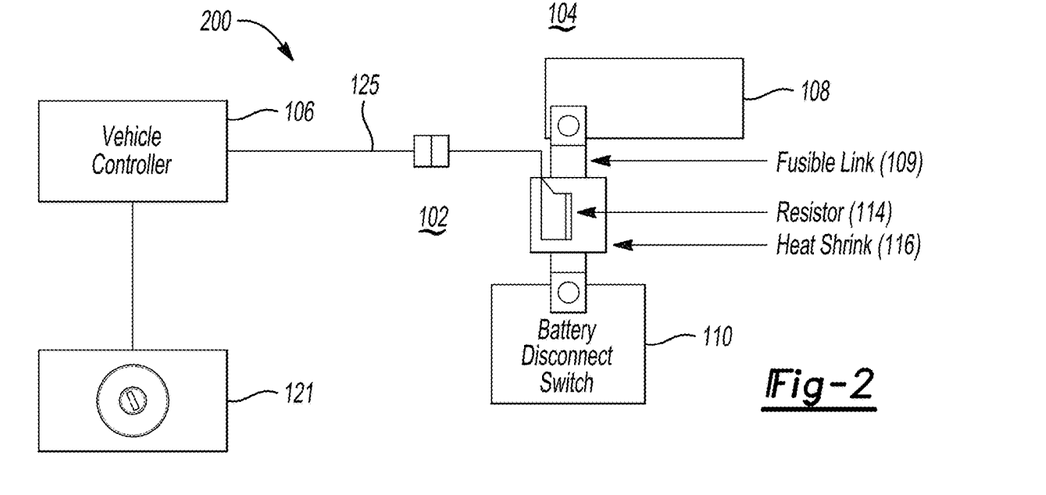
FIG. 2 generally depicts a second system for early insulation damage detection for a battery cable for a vehicle in accordance with one embodiment.

FIG. 2 generally depicts a second system 200 for early insulation damage detection for the battery cable 102 of the vehicle 104 in accordance with one embodiment. The second system 200 includes the vehicle controller 106, the battery 108, and a smart fusible link 109 (or fusible link 109). In general, the battery cable 102 may be coupled to the battery 108 and to a power distribution box (not shown). The battery disconnect switch 110 is provided to disconnect the battery 108 from the vehicle 104 in moments in which the current across the battery 108 exceeds a predetermined limit. As shown, the fusible link 109 is coupled to the battery 108 and the battery disconnect switch 110. It is recognized that the battery cable 102 itself may be coupled to the battery 108 at one end thereof and the other end of the battery cable 102 may be coupled to one end of the fusible link 109. In this instance, the other end of the fusible link 109 may be coupled to one or more wires that are connected to the battery disconnect switch 110. Alternatively, the other end of the fusible link 109 may be coupled directly to the battery disconnect switch 110.

The fusible link 109 may include at least one resistive device (hereafter "resistive device") 114 and heat shrink 116. The resistive device 114 may be attached to the fuse link 109. The heat shrink 116 may be positioned around (or surrounds) the resistive device 114. In general, the fusible link 109 may include at least one controller ("the controller") (not shown) and a transmitter (not shown) embedded therein. The controller may measure a current across the resistive device 114 (or voltage of the resistive device 114) and may transmit the measured current to the vehicle controller 106 via the wired connection 125. Alternatively, the vehicle controller 106 may measure the current directly across the resistive device 114. The vehicle controller 106 may determine whether the current across the fusible link 109 is similar to a predetermined current level (or similarly whether the measured voltage is similar to a predetermined voltage level or whether the measured resistance is similar to a predetermined resistance level). In the event the vehicle controller 106 determines that the current, voltage, or resistance of the fusible link 109 is similar to the predetermined current level, the predetermined voltage level, or the predetermined resistance level, respectively, the vehicle controller 106 determines that the fusible link 109 is the proper link being used in the vehicle 106. In this case, the vehicle controller 106 enables the vehicle 104 (or truck) to start since the correct fusible link 109 has been installed in the vehicle 104. In the event the vehicle controller 106 determines that the current, voltage, or resistance of the fusible link 109 is not similar to the predetermined current level, the predetermined voltage level, or the predetermined resistance level, respectively, the vehicle controller 106 determines that the fusible link 109 is not the proper link to be used in the vehicle 104. In this regard, the vehicle controller 106 may not enable the vehicle 104 to be started.

The vehicle controller 106 may include a wireless transceiver (not shown) for communicating with a wireless transmitter (not shown) positioned on the fusible link 109. The wireless transmitter positioned on the fusible link 109 may serve as an alternative to the resistive device 114. In one example, the vehicle controller 106 and the fusible link 109 may communicate with one another via radio frequency (RF) ID transfer, a BLUETOOTH communication protocol, or other suitable wireless communication protocol. In this case, the fusible link 109 may wirelessly transmit an identification to the vehicle controller 106 to identify the fusible link 109 when the link 109 is installed in the vehicle 104. The vehicle controller 106 includes memory for storing any number of identifications belonging to approved or authorized fusible links 109. The purpose of having the link 109 wirelessly transmit the identification to the vehicle controller 106 is that the vehicle controller 106 can validate that the correct fusible link 109 is being installed in the vehicle 104. For example, in the event the operator ignores warnings that are issued in connection with the battery cable 102 that exhibits early signs of chaffing or rubbing via the first system 100 as set forth above, it is possible that the fusible link 109 will "pop" or break first (i.e., before the battery cable 102 exhibits a true short circuit condition and is no longer operable). To prevent the operator from ignoring the early warnings as set forth above in connection with the first system 100 and also in the event the fusible link 109 pops or exhibits the short circuit condition and further to prevent the operator from simply installing any fusible link, the vehicle controller 106 determines whether the installed fusible link 109 is the correct link based on the identification as transmitted from the link 109 or based on the current draw across the resistive device 114. It is recognized that other types of electronic confirmation devices or validation devices in addition to those disclosed herein and that those mentioned herein are not intended to be exhaustive.

In the event the vehicle controller 106 determines that the identification as transmitted from the fusible link 109 is invalid (i.e., or not received altogether) or that the current being measured doesn't correspond to a predetermined current limit, the vehicle controller 106 may not allow the vehicle 104 to crank (or start). An ignition switch 121 is operably coupled to the vehicle controller 106. Thus, in this regard, the vehicle controller 106 may receive an indication to start the vehicle 104 via the ignition switch 121. In the event the fusible link 109 is not proper, then the vehicle controller 106 may ignore requests to start the vehicle as received via the ignition switch 121.

Figure 3:
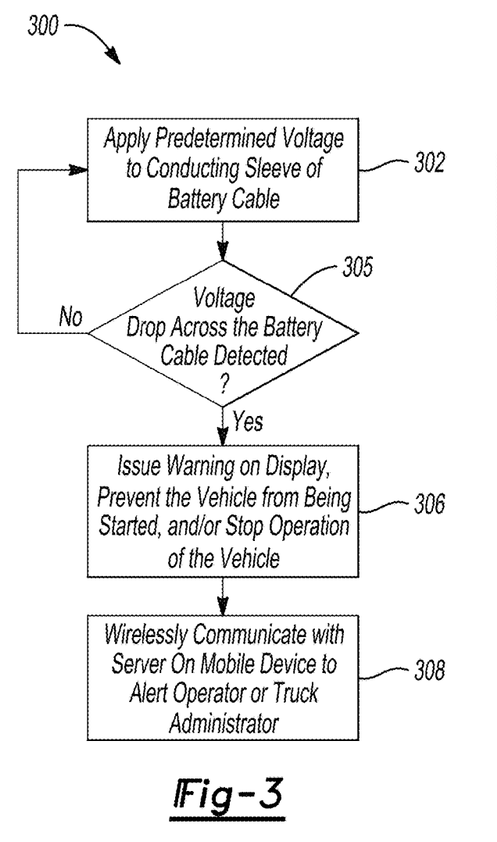
FIG. 3 generally depicts a method for early insulation damage detection for a battery cable for the first system of FIG. 1 in accordance with one embodiment.

FIG. 3 generally depicts a method 300 for early insulation damage detection for the battery cable 102 for the first system 100 of FIG. 1 in accordance with one embodiment.

In operation 301, the vehicle controller 106 (or other voltage source positioned in the vehicle 104) provides a predetermined voltage to the conducting sleeve 124 on the battery cable 102. This may occur before the truck 104 is started or after the truck 104 has been started.

In operation 305, the vehicle controller 106 determines whether a voltage drop or current increase has occurred at the conducting sleeve 124. It is recognized that the vehicle controller 106 may receive voltage from a voltage sensor that is external to the vehicle controller 106 or that the vehicle controller 106 may include a voltage sensor and monitor the voltage or current directly to determine if a voltage drop occurred at the conducting sleeve 124. If a voltage drop or current increase was detected, then the method 300 moves to operation 306. If not, then the method 300 moves back to operation 302.

In operation 306, the vehicle controller 106 transmits a command to the display 132. The display 132 visually alerts the operator that there is an issue with the battery cable 102. The display 132 may also audibly generate a warning to also alert the operator of an issue with the battery cable 102. The vehicle controller 106 may activate the illumination device 112 to provide notice to the operator that the battery cable 102 requires servicing before the battery cable 102 actually exhibits a short condition. The vehicle controller 106 may also disable the starter 107 and prevent the vehicle 104 from being started to ensure that the driver immediately seeks servicing of the battery cable 102. In addition, the vehicle controller 106 may deactivate the engine of the vehicle 104 in the event the battery cable 102 exhibits the failure after the vehicle 104 has been started. However, in this case, the vehicle 104 is in park and has started but is not moving for the vehicle controller 106 to deactivate the engine of the vehicle 104 when the battery cable 102 exhibits the failure.

In operation 308, the vehicle controller 106 may wirelessly transmit a signal to a server (not shown) that alerts a vehicle or truck administrator. As noted above, the vehicle controller 106 may wirelessly transmit a message via BLUETOOTH to a mobile device belonging to the operator. In another example, the vehicle controller 106 may wirelessly transmit a message via cellular network to the operator or to a truck administrator to alert the same of an issue related to the battery cable 102.

Figure 4:
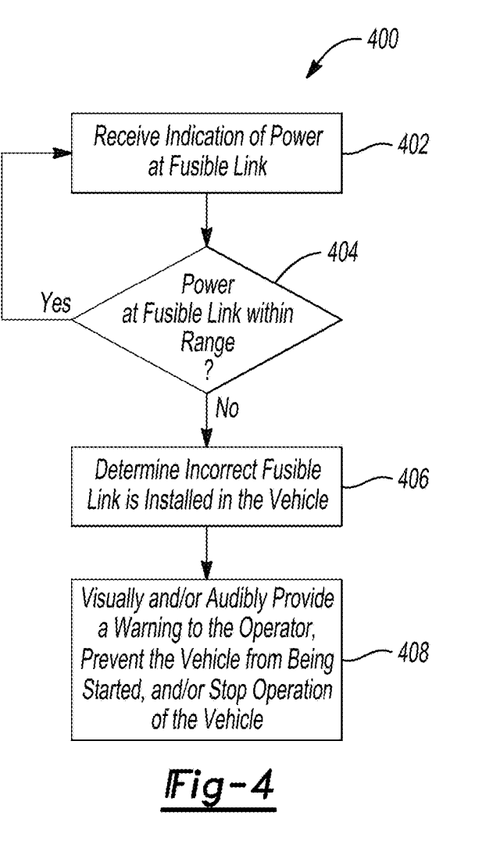
FIG. 4 generally depicts a method for early insulation damage detection for the battery cable for the second system of FIG. 2 in accordance with one embodiment.

FIG. 4 generally depicts a method 400 for early insulation damage detection for the battery cable 102 in accordance with another embodiment.

In operation 402, the vehicle controller 106 receives an indication of a power level (e.g., current or voltage) of the fusible link 109. As noted above, in one embodiment, the vehicle controller 106 may either receive voltage or current across the resistive device 114 from the controller of the fusible link 109 or determine voltage or current across the resistive device 114 (or resistance) formed at the fusible link 109 by utilizing a voltage or current sensor to receive the voltage or current directly from the resistive device 114 (or resistance) formed at the fusible link 109.

Alternatively, in operation 402, the controller positioned on the fusible link 109 may wirelessly transmit an identification to indicate the type of fusible link 109 that is installed on the vehicle 104 as opposed to transmitting data indicative of voltage or current of the fusible link 109.

In operation 404, the vehicle controller 106 determines whether the power level of the fusible link 109 is acceptable. For example, the vehicle controller 106 may compare the determined voltage or current measurement to a predetermined voltage or current value, respectively, to determine if the fusible link 109 is acceptable. If the vehicle controller 106 determines that the determined/measured voltage or current measurement is similar to the predetermined voltage or current value, respectively, then the method 400 moves back to operation 402 and the installed fusible link 109 is determined to be correct. If not, then the method 400 moves to operation 406.

Similarly, as noted in connection with the alternate embodiment identified in operation 402, the vehicle controller 106 may compare the identification as received from the fusible link 109 to a number of stored identifications to determine if the received identification matches any one of the stored identifications. If the vehicle controller 106 determines that received identification from the fusible link 109 is similar to the stored identification, then the method 400 moves back to operation 402 and the installed fusible link 109 is determined to be correct. If not, then the method 400 moves to operation 406.

In operation 406, the vehicle controller 106 determines that the installed fusible link 109 is not a correct fusible link that should be installed in the vehicle 104. In this case, it is possible that the fusible link 109 may not be able to handle the proper current from the vehicle 104. The vehicle controller 106 may control the display 132 to warn the operator of the improper fusible link 109.

In operation 408, the display 132 may visually and/or audibly provide a warning to the operator. In addition, the vehicle controller 106 may ignore any commands by the ignition switch 121 to start the vehicle 104.

Figure 5:
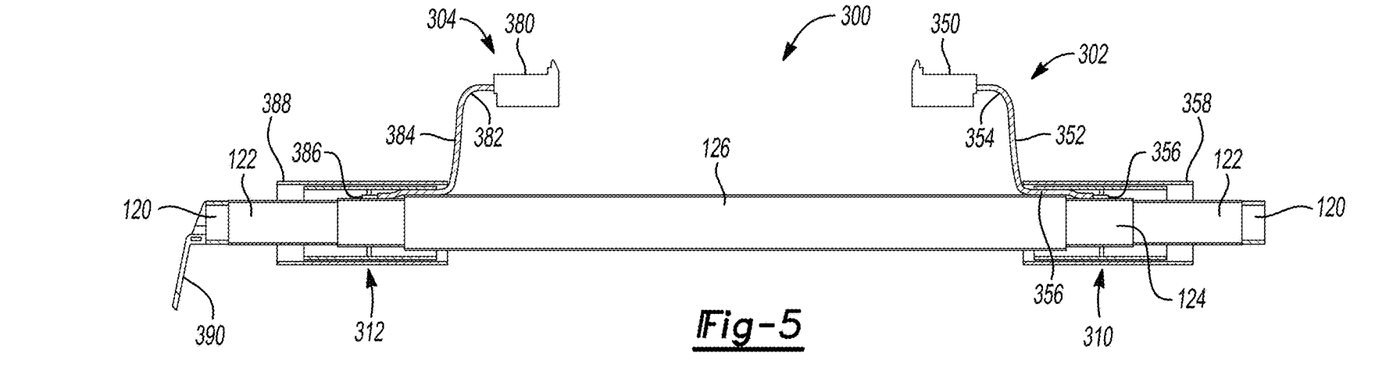
FIG. 5 generally depicts a more detailed illustration of a battery cable in accordance with one embodiment.

FIG. 5 generally depicts a more detailed illustration of a battery cable 300 that may be used in connection with the first system 100 in accordance with one embodiment. The battery cable 300 includes the inner conductor 120, the first insulation layer 122, a conducting sleeve 124 (or detection shield), the outer insulation layer 126, a first connector assembly 302, a second connector assembly 304. As noted above, the inner conductor 120 conducts current from the battery 108 to the rest of the components in the vehicle 104. The first insulation layer 122 provides a protective coating over the inner conductor 120. The conducting sleeve 124 is placed around, or completely surrounds the first insulation layer 122. To prevent the inner conductor 120 from contacting sheet metal or other blunt objects, the conducting sleeve 124 is placed completely around, or completely surrounds the first insulation layer 122.

The battery cable 300 includes a first side 310 and a second side 312. The first connector assembly 302 is positioned on the first side 310 of the battery cable 300. The second connector assembly 304 is positioned on the second side 312 of the battery cable 300. The first connector assembly 302 includes a first connector 350 and a first conductive sleeve 352. The first connector 350 and the first conductive sleeve 352 electrically couples the conducting sleeve 124 to the vehicle controller 106.

The first conductive sleeve 352 includes a first insulated conductive portion 354 and a first uninsulated conductive portion 356. The first insulated conductive portion 354 includes electrically conductive wiring that is covered by insulation. The first uninsulated conductive portion 356 includes the electrically conductive wiring that is exposed and can be electrically coupled to the conducting sleeve 124. A first insulator (e.g., a first heat shrink) 358 may be placed over the first uninsulated conductive portion 356, the conducting sleeve 124, the first insulation layer 122, and the inner conductor 120 to cover and protect the first uninsulated conductive portion 356 and/or the conducting sleeve 124 from coming into contact with an interface (e.g., sheet metal) on the vehicle 104 that may sever as a conductor.

The second connector assembly 304 includes a second connector 380 and a second conductive sleeve 382. The second connector 380 and the second conductive sleeve 382 electrically couples the conducting sleeve 124 to the vehicle controller 106.

The second conductive sleeve 382 includes a second insulated conductive portion 384 and a second uninsulated conductive portion 386. The second insulated conductive portion 384 includes electrically conductive wiring that is covered by insulation. The second uninsulated conductive portion 386 includes the electrically conductive wiring that is exposed and can be electrically coupled to the conducting sleeve 124. A second insulator (e.g., a second heat shrink) 388 may be placed over the second uninsulated conductive portion 386, the conducting sleeve 124, the first insulation layer 122, and the inner conductor 120 to cover and protect the second uninsulated conductive portion 386 and/or the conducting sleeve 124 from coming into contact with an interface (e.g., sheet metal) on the vehicle 104 that may serve as a conductor. A battery terminal 390 may be positioned on the second side 312 to couple the battery cable 300 to the battery 108.

In operation and with reference to FIGS. 1 and 3, the vehicle controller 106 may apply a voltage to the first connector 350 which generates a current across the conducting sleeve 124. The second connector 380 may be operably coupled to the display 132 and/or the illumination device 112 to provide power thereto. In one example, the second connector 380 may power the illumination device 112 via the current across the conducting sleeve 124 when the battery cable 102 is operating a normal mode (e.g., there is no chaffing of the outer insulation layer 126). In the event the outer insulation layer 126 is damaged and the conducting sleeve 124 comes into contact with an interface (e.g., sheet metal) on the vehicle 104, such a condition may lead to an increase in current (or voltage drop) and the vehicle controller 106 disables voltage across the conducing sleeve 124. In response to this condition, the illumination device 112 is disabled to indicate to the user/driver that battery cable 300 is exhibiting a failure. In addition, the vehicle controller 106 may also prevent the vehicle 104 from being started. In one example, the illumination device 112 may positioned on a battery box (not shown) that is visible to the driver from an exterior of the vehicle 104. Generally, the driver is required to activate the battery disconnect switch 110 in the battery box prior to starting the vehicle 104 and will notice that the illumination device 112 is not active which indicates a failure to the battery cable 300. The driver will not be able to activate the switch in the battery box prior to starting the vehicle 104 as the switch is disabled in response to the battery cable 300 exhibiting a failure.

Figure 6:
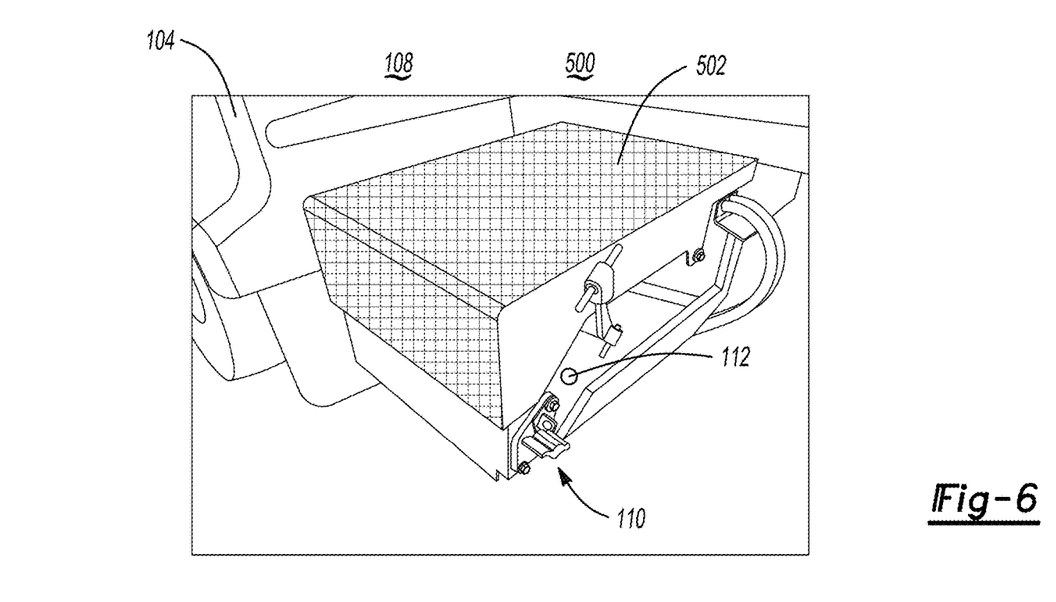
FIG. 6 generally depicts a view of an exterior of the vehicle including a battery box positioned thereon.

FIG. 6 depicts a view of an exterior 500 of the vehicle 104 including a battery box 502 positioned thereon. As noted above, the battery box 502 is positioned on the exterior 500 of the vehicle 104. The battery box 502 generally includes the battery disconnect switch 110 and the illumination switch 112 positioned thereon. As noted above, the driver is required to activate the battery disconnect switch 110 in order to start the vehicle 104. In the event the battery cable 300 is exhibiting the failure, the driver will notice the alert provided on illumination switch 112. In the event the driver does not notice the alert on the illumination switch 112 on the exterior 500 of the vehicle 104, the driver receives another alert on the display 132 (via the vehicle controller 106) as positioned in the vehicle 104.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a battery cable having a detection shield positioned over a first insulation layer and an inner conductor;
at least one vehicle controller programmed to:
provide a predetermined current or voltage to the detection shield;
receive a first signal indicative of measured current or voltage of the detection shield of the battery cable after providing the predetermined current or voltage to the detection shield;
compare the measured current or voltage of the detection shield to a predetermined value; and
generate an alert indicative of a warning that the battery cable is exhibiting a failure prior to a short circuit condition occurring at the battery cable in the event the measured current or voltage is not equal to the predetermined value,
wherein the battery cable includes a second insulation layer that is positioned over the detection shield and the first insulation layer, and
wherein the battery cable includes a first end and a second end, wherein the detection shield is exposed and free of the second insulation layer at each of the first end and the second end while including the second insulation layer being positioned on the detection shield at an area between the first end and the second end;

a first connector assembly including a first connector and a first uninsulated conductive portion, wherein the first uninsulated conductive portion directly contacts the detection shield at the first end to one of (i) provide the predetermined current or voltage from the vehicle controller to the detection shield, and (ii) transmit the first signal indicative of the measured current or voltage to the at least one vehicle controller; and a first insulator positioned over the first uninsulated conductive portion and the detection shield at the first end to protect the first uninsulated conductive portion and the detection shield from contacting a conductive interface positioned in a vehicle.

2. The system of claim 1, wherein the first insulation layer is positioned between the detection shield and the inner conductor, and wherein the detection shield is positioned between first insulation layer and the second insulation layer.

3. The system of claim 1 further comprising an illumination device to provide the alert indicative of the warning that the battery cable is exhibiting a failure at the second insulation layer.

4. The system of claim 3, wherein the illumination device is located in one of an exterior of a vehicle or an interior of the vehicle.

5. The system of claim 1, wherein the at least one vehicle controller is further programmed to prevent a vehicle from being started in response to the current or voltage not being equal to the predetermined value.

6. The system of claim 1, wherein the at least one vehicle controller is further configured to wirelessly transmit a second signal indicative of the alert to one of a mobile device or a server that is external to a vehicle.

7. The system of claim 1, wherein the at least one vehicle controller is further programmed to disable providing the predetermined current or voltage to the detection shield in response to the measured current or voltage not being equal to the predetermined value.

8. The system of claim 1, wherein the at least one vehicle controller is further programmed to receive the first signal indicative of the measured current or voltage of the detection shield at least when the second insulation layer is damaged.

9. The system of claim 1 further including a second connector assembly including a second connector and a second uninsulated conductive portion, wherein the second uninsulated conductive portion directly contacts the detection shield at the second end, opposite to the first end, to one of (i) provide the predetermined current or voltage from the vehicle controller to the detection shield, and (ii) transmit the first signal indicative of the measured current or voltage to the at least one vehicle controller.

10. The system of claim 9 further including a second insulator positioned over the second uninsulated conductive portion and the detection shield at the second end to protect the second uninsulated conductive portion and the detection shield from contacting the conductive interface positioned in the vehicle.

11. A system comprising:
a battery cable including:
an outer insulation layer,
a detection shield being surrounded by the outer insulation layer,
an inner insulation layer being surrounded by the detection shield, and
an inner conductor being surrounded by the inner insulation layer; and
at least one vehicle controller programmed to:
provide a predetermined current or voltage to the detection shield;
receive a first signal indicative of measured current or voltage of the detection shield of the battery cable after providing the predetermined current or voltage to the detection shield;
compare the measured current or voltage of the detection shield to a predetermined value; and
generate an alert indicative of a warning that the battery cable is exhibiting a failure by the outer insulation layer being damaged in response to the measured current or voltage not being equal to the predetermined value;
wherein the battery cable includes a first end and a second end,
wherein the detection shield is exposed and free of the outer insulation layer at each of the first end and the second end while including the outer insulation layer being positioned on the detection shield at an area between the first end and the second end;
a first connector assembly including a first connector and a first uninsulated conductive portion, wherein the first uninsulated conductive portion directly contacts the detection shield at the first end to one of (i) provide the predetermined current or voltage from the vehicle controller to the detection shield, and (ii) transmit the first signal indicative of the measured current or voltage to the at least one vehicle controller; and
a first insulator positioned over the first uninsulated conductive portion and the detection shield at the first end to protect the first uninsulated conductive portion and the detection shield from contacting a conductive interface positioned in a vehicle.

12. The system of claim 11, wherein the at least one vehicle controller is further programmed to disable providing the predetermined current or voltage to the detection shield in response to the measured current or voltage not being equal to the predetermined value.

13. The system of claim 11 further including a second connector assembly including a second connector and a second uninsulated conductive portion, wherein the second uninsulated conductive portion directly contacts the detection shield at the second end, opposite to the first end, to one of (i) provide the predetermined current or voltage from the vehicle controller to the detection shield, and (ii) transmit the first signal indicative of the measured current or voltage to the at least one vehicle controller.

14. The system of claim 13 further including a second insulator positioned over the second uninsulated conductive portion and the detection shield at the second end to protect the second uninsulated conductive portion and the detection shield from contacting the conductive interface positioned in the vehicle.

* * * * *